United States Patent Office 3,456,018
Patented July 15, 1969

3,456,018
**6-ALKOXY-1,2,3,4,5,8-HEXAHYDRONAPH-
THALENES**
Daniel Lednicer, Portage, Mich., assignor to The Upjohn
Company, Kalamazoo, Mich., a corporation of
Delaware
No Drawing. Continuation-in-part of application Ser. No.
364,288, May 1, 1964. This application Nov. 13, 1967,
Ser. No. 682,634
Int. Cl. C07c *43/00, 43/02*
U.S. Cl. 260—611     2 Claims

ABSTRACT OF THE DISCLOSURE

The invention is a group of organic compounds having the following formula:

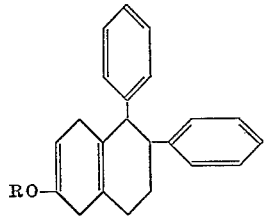

wherein R is an alkyl radical of from 1 to 8 carbon atoms, inclusive. These compounds have pharmacological uses, for example, as antifertility, estrogenic, antiestrogenic, antispermatogenic, hypocholesteremic and lipid-mobilizing agents.

CROSS REFERENCE TO RELATED APPLICATION

This application is a continuation-in-part of my copending application Ser. No. 364,288, filed May 1, 1964, now abandoned.

DESCRIPTION

This invention relates to novel organic compounds. In particular, this invention relates to compounds of the formula:

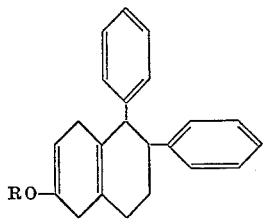

(III( wherein R is lower-alkyl, containing from 1 to 8 carbon atoms, inclusive.

The term "lower-alkyl" means an alkyl radical of from 1 to 8 carbon atoms, inclusive, such as methyl, ethyl, propyl, butyl, pentyl, hexyl, heptyl, octyl, and isomeric forms thereof.

The term "novel compounds of the invention" as used throughout the specification embraces the compounds represented by the formulae III above.

The novel compounds of this invention as defined above are active as antifertility agents. Illustratively, the compound 6-methoxy-1,2-diphenyl-1,2,3,4,5,8-hexahydronaphthalene exhibits oral antifertility activity in rats when tested by the method described by Duncan et al., Proc. Soc. Exp. Biol. Med. 112, 439–442, 1963.

The novel compounds of the invention are valuable for animal pest control. For example, the compounds of the invention are formulated in combination with baits and/or attractants and placed in feeding stations accessible to undesirable rodents and other small animals including Canidae such as coyotes, foxes, wolves, jackals, and wild dogs and birds such as starlings, gulls, redwing blackbirds, pigeons, and the like, thus reducing hazards to aviation by their presence on runways and in the vicinity of airfields, the spread of disease, and destruction to property in both rural and urban areas.

For purposes of administration to birds and to mammals, including animals of economic value such as horses, cattle, sheep, pigs, mice, rats, rabbits, and the like, the novel compounds of the invention can be combined with solid or liquid pharmaceutical carriers and formulated in the form of tablets, powder packets, capsules, and like solid dosage forms, using starch and like excipients, or dissolved or suspended in suitable solvents or vehicles, for oral or parental administration.

The novel compounds of the invention are prepared in accordance with the reactions shown in the following flowsheet:

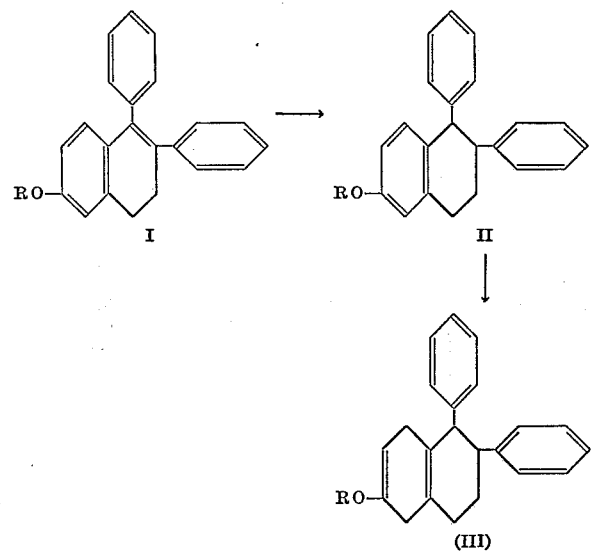

wherein R is defined as above.

The 1,2-diphenyl-6-alkoxy-3,4-dihydronaphthalenes (I) employed as starting materials are subjected to reduction by methods well known in the art for the saturation of ethenoid bonds to give the corresponding 1,2,3,4-tetrahydronaphthalenes (II). The reduction can be effected using reducing agents such as sodium in the presence of an alkanol, for example, methanol, ethanol, propanol, isobutyl alcohol, and the like, and lithium and like alkali metals in the presence of liquid ammonia. The use of lithium and liquid ammonia is the preferred method of effecting the reduction of (I) to (II).

Using the latter reducing agent, the reduction can be carried out by adding an approximately stoichiometric amount of lithium, advantageously in the form of lithium wire, to a solution of the dihydronaphthalene (I) in a mixture of liquid ammonia and an inert organic solvent such as tetrahydrofuran, benzene, toluene, ethanol, methanol, isobutyl alcohol, tertiary butyl alcohol, and the like, or a mixture of such solvents. The reduction occurs rapidly and is usually substantially complete in a period of from about 15 minutes to about 1 hour, though longer reaction periods may be necessary with certain compounds. The desired product (II) is isolated from the reaction mixture by conventional procedures; for example, by evaporation of the solvent after addition of ammonium chloride, followed by solvent extraction of the residue, evaporation of solvent from the extract, and purification of the resulting product by recrystallization, chromatography, or like conventional procedures.

The compounds of the invention having the Formula III wherein $R_2$ is hydrogen, hydroxy, lower-alkyl or halogen are obtained by subjecting the corresponding compounds having the Formula II to a Birch reduction. The latter reductive procedure, named after A. J. Birch who was responsible for its discovery, involves the use of lithium in liquid ammonia as the reducing agent. The procedure under which this reaction is carried out, which procedure is employed in the context of the present invention, has been extensively reviewed in the literature; see, for example, Quarterly Reviews 4, 69, 1950; ibid., 12, 17, 1958. Generally speaking, the Birch reduction is carried out in the context of the present invention by adding metallic lithium, preferably in the form of a wire, portionwise to a solution of the compound (II) in a mixture of liquid ammonia and a combination of inert organic solvents one of which is an ether such as tetrahydrofuran, diethyl ether and dioxane, and the other is an alkanol such as ethanol, isopropyl alcohol, butanol, t-butyl alcohol, and the like. The lithium is preferably employed in excess of the stoichiometric proportions, advantageously in an excess of the order of about 10 gram-atoms of lithium per mole of compound (II). When the reduction is substantially complete, as determined by analytical techniques such as paper or thin layer chromatography and the like, the mixture is treated with ammonium chloride and the solvents are removed by evaporation. The desired compound (III) is isolated from the residue by conventional techniques, for example, treatment with water followed by isolation of the insoluble material by filtration and purification by recrystallization, chromatography, and like techniques.

The compounds having the Formula I which are employed as starting materials in the process of the invention can be prepared according to the following reaction scheme:

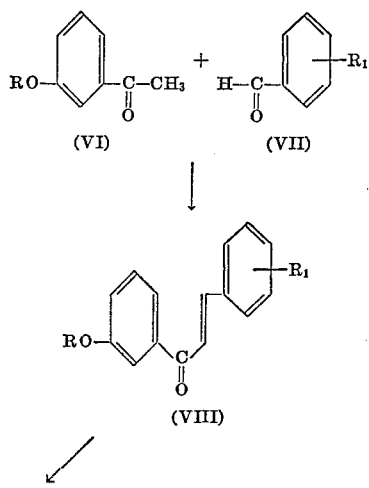

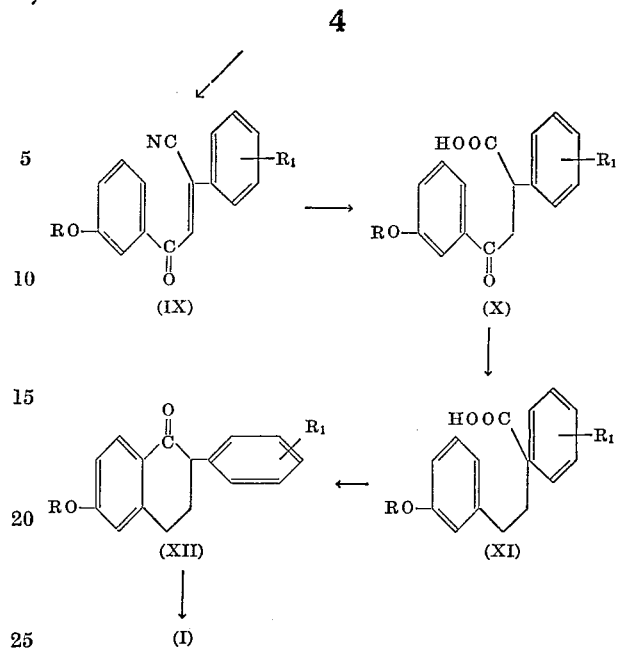

In the above formulae R and $R_1$ have the significance hereinbefore defined.

In the above reaction sequence, the appropriately substituted acetophenone (VI) is condensed with the appropriately substituted benzaldehyde (VII) to produce the corresponding chalcone (VIII) under conditions conventionally employed in the preparation of chalcones, for example, by condensation of (VI) and (VII) in the presence of a base such as sodium hydroxide, potassium hydroxide, and the like, in an inert solvent such as a mixture of water and a lower alkanol, for example, methanol, ethanol and the like. The reaction is generally conducted at or below room temperature (approximately 20 to 25° C.) with external cooling as required. The chalcone (VIII) is isolated from the reaction mixture and purified by conventional procedures, for example, by solvent extraction followed by distillation, in the case of a liquid product, or recrystallization in the case of a solid product.

The chalcone (VIII) so obtained is then converted to the corresponding nitrile (IX) by reaction with hydrogen cyanide, for example, by treatment with an alkali metal cyanide such as potassium cyanide, sodium cyanide, and the like, in the presence of acetic acid and an inert solvent such as aqueous methanol, aqueous ethanol, and the like, using the procedure described by Newman, J. Am. Chem. Soc. 60, 2947, 1938 for the conversion of benzalacetophenone (chalcone) to α-phenyl-β-benzoylpropionitrile. The desired nitrile (IX) generally separates from the reaction mixture as a solid and can be isolated by filtration and purified by recrystallization.

The nitrile (IX) so obtained is hydrolyzed to the corresponding keto acid (X) by conventional procedures for the hydrolysis of nitriles, for example, by heating under reflux in the presence of aqueous mineral acid such as sulfuric acid until hydrolysis is substantially complete. The desired acid (X) generally separates from the reaction mixture as a solid and is isolated by filtration and purified by recrystallization or by other conventional procedures, for example, by conversion to an alkali metal salt followed by acidification of the latter to regenerate the free acid.

The keto acid (X) so obtained is then subjected to reduction to form the corresponding acid (XI). The reduction can be effected using any of the methods customarily employed for the conversion of a keto group to a methylene group. A particularly suitable reducing agent is amalgamated zinc; for example, treatment of the keto acid (X) with amalgamated zinc in the presence of a mineral acid affords the desired acid (XI) in excellent yield. The acid (XI) can be isolated from the reaction mixture by conventional procedures, for example, by decantation of the liquid reaction mixture, followed by solvent extraction of the decanted liquid and evaporation of the solvent. Generally speaking, the acid (XI) so obtained is sufficiently pure to be used in the next step of the synthesis without further treatment. If desired, however, the acid (XI) so obtained can be purified by conventional procedures, for example, by distillation in the case of a liquid or recrystallization in the case of a solid, or by conversion to an alkali metal salt followed by acidification of the latter to yield the free acid.

In the next stage of the synthesis the acid (XI) is cyclized to the required α-tetralone (XII) in the presence of a Lewis acid using the general procedure described by Fieser and Hershberg, J. Am. Chem. Soc. 61, 1272, 1939. The term "Lewis acid" is well known in the art and is defined succinctly by Fieser and Fieser, "Organic Chemistry," third edition, page 138 (Reinhold, 1956). Examples of such compounds are hydrogen fluoride, boron trifluoride, arsenic trifluoride, phosphorus pentafluoride, titanium tetrafluoride, concentrated sulfuric acid, polyphosphoric acid, and the like. The preferred Lewis acid for use in the above process is hydrogen fluoride.

A particularly convenient method of cyclizing the acid (XI) according to the above procedure comprises adding the acid (XI) to liquid hydrogen fluoride with stirring and then allowing the hydrogen fluoride to evaporate at about 20 to 30° C. The desired α-tetralone (XII) is then isolated from the residue by conventional methods, for example, by dissolving the residue in a suitable solvent such as diethyl ether, washing the solution so obtained with an aqueous solution of a base such as sodium carbonate, sodium hydroxide, and the like, and then evaporating the washed solution to dryness. The α-tetralone (XII) so obtained can be purified, if desired, by conventional procedures, for example, by recrystallization.

Alternatively, the acid (XI) can be cyclized to the α-tetralone (XII) by conversion of the acid (XI) to the corresponding acid chloride and treatment of the latter with aluminum chloride or stannic chloride according to the procedure described by Fieser et al., J. Am. Chem. Soc. 60, 170, 1938.

The α-tetralone (XII) is condensed with the appropriate Grignard reagent

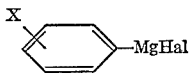

wherein X is as hereinbefore defined with the exception noted below, and Hal represents halogen, preferably bromine or iodine, to give the corresponding compound (I). The reaction is carried out under conditions normally employed in conducting Grignard reactions. Thus, the reaction is carried out under anhydrous conditions, advantageously in the presence of an inert solvent such as dibutyl ether, diisopropyl ether, tetrahydrofuran, and the like. The preferred solvent is tetrahydrofuran. The reaction can be carried out at temperatures within the range of about 0° C. to about the boiling point of the solvent employed, and preferably is carried out within the range of about 15° to about 30° C.

The desired product (I) can be isolated from the reaction mixture by conventional procedures. For example, the reaction mixture from the above-described Grignard reaction is decomposed by the addition of water, ammonium chloride, and the like, followed by separation of the organic layer and removal of the solvent therefrom. The residue is purified, if desired, by conventional procedures, for example, by chromatography, recrystallization, and the like.

The Grignard reagents employed in the conversion of the α-tetralones (XII) to the compounds (I) are prepared by reaction of magnesium in an anhydrous inert organic solvent such as dibutyl ether, diisopropyl ether, tetrahydrofuran, and the like, with the appropriately substituted halobenzene, using procedures well known in the art for the preparation of Grignard reagents.

The acetophenones (VI) which are employed as starting materials in the above-described synthesis of the α-tetralones (XII) can be prepared from the corresponding nuclear-substituted benzoic acids by conversion of the latter to the acid chlorides followed by reaction of the latter with dimethyl cadmium according to the procedure described in Chemical Reviews 40, 15, 1947. Many of the acetophenones (VI) are known in the literature.

The benzaldehydes (VII) which are employed as starting materials in the above-described synthesis of the α-tetralones (XII) can be obtained by reduction of the corresponding substituted benzoyl chlorides using lithium tri-t-butoxyaluminum hydride using the procedure described by Brown et al., J. Am. Chem. Soc. 80, 5377, 1958. Many of the benzaldehydes of the Formula VII are known in the literature.

An alternative method for the preparation of the α-tetralones of formula XII is that described by Newman, J. Am. Chem Soc. 62, 2295, 1940. The method comprises the appropriately substituted benzyl cyanide

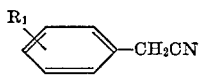

with the appropriately substituted phenethyl bromide

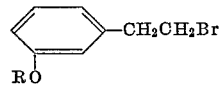

$R_1$ and R having the significance hereinbefore defined, in the presence of sodamide and hydrolyzing the resutling nitrile to give the corresponding acid (XI) which is then cyclized as hereinbefore described to the α-tetralone (XII).

The following preparations and examples illustrate the best method contemplated by the inventor for carrying out his invention.

PREPARATION 1

*3'-methoxychalcone*

A solution of 45 g. of m-methoxyacetophenone in 75 ml. of 95% ethanol was added to a cooled solution of 16 g. of sodium hydroxide in 140 ml. of water. The mixture was then placed in an ice bath and 31.8 g. of benzaldehyde was added at such a rate as to keep the temperature below 20° C. The mixture was stirred for an additional 30 minutes in the cold and was then stirred for 27 hours at about 25° C. The restuling solution was extracted with ether and the extract was washed with saturated sodium chloride solution before being percolated through anhydrous magnesium sulfate and evaporated to dryness under reduced pressure. There was thus obtained 50.9 g. of 3'-methoxychalcone in the form of an oil having a boiling point of 180 to 185° C. at a pressure of 4 mm. of mercury.

Using the above procedure, but replacing m-methoxyacetophenone by the following compounds: m-ethoxy, m-pentyloxy- (prepared by esterification of m-hydroxyacetophenone with pentyl bromide), m-hexyloxy- (prepared from m-hydroxyacetophenone by etherification with hexyl bromide), and m-isoöctyloxyacetophenone (prepared from m-hydroxyacetophenone by etherification with isoöctyl bromide), there are obtained 3'-ethoxy-, 3'-pentyloxy, 3'-hexyloxy-, and 3'-isoöctyloxychalcone, respectively.

Similarly, using the procedure described in Preparation 1, but replacing benzaldehyde by the following known compounds: 2-bromobenzaldehyde, 3-chlorobenzaldehyde, 2-chloro-6-fluorobenzaldehyde, 2,3-dichlorobenzaldehyde, p-tolualdehyde, and 2,6-dimethylbenzaldehyde, there are obtained 2-bromo-3'-methoxychalcone, 3-chloro-3'-methoxychalcone, 2-chloro-6-fluoro-3'-methoxychalcone, 2,3- dichloro-3'-methoxychalcone, 4-methyl-3'-methoxychalcone and 2,6-dimethyl-3'-methoxychalcone, respectively.

PREPARATION 2

*2-phenyl-4-(3-methoxyphenyl)-4-ketobutyronitrile*

A solution of 27.8 g. of potassium cyanide in 50 ml. of water was added to a mixture of 50.9 g. of 3'-methoxychalcone, 13.0 g. of acetic acid, and 100 ml. of 95% ethanol over a period of 10 minutes. The temperature was maintained at 45° C. The turbid mixture was then stirred for 6 hours and allowed to stand overnight in the cold. The crystalline solid which had separated was isolated by filtration, washed with ice-cold aqueous ethanol and with water, and recrystallized from ethanol. There was thus obtained 49.22 g. of 2-phenyl-4-(3-methoxyphenyl)-4-ketobutyronitrile in the form of a crystalline solid having a melting point of 96 to 101° C. The infrared spectrum of the compound (mineral oil mull) exhibited maxima at 2200, 1660, and 1580 reciprocal centimeters.

Using the above procedure, but replacing 3'-methoxychalcone by 3'-ethoxy-, 3'-pentyloxy-, 3'-hexyloxy-, 3'-isoöctyloxy-, 2-bromo-3'-methoxy-, 3-chloro-3'-methoxy-, 2-chloro-6-fluoro-3'- methoxy-, 2,3-dichloro-3'-methoxy-, 4-methyl-3'-methoxy-, and 2,6-dimethyl-3'-methoxychalcone, there are obtained 2-phenyl-4-(3-ethoxypehnyl)-4-ketobutyronitrile,
2-phenyl-4-(3-pentyloxyphenyl)-4-ketobutyronitrile,
2-phenyl-4-(3-hexyloxyphenyl)-4-ketobutyronitrile,
2-phenyl-4-(3-isoöctyloxyphenyl)-4-ketobutyronitrile,
2-(2-bromophenyl)-4-(3-methoxyphenyl)-4-ketobutyronitrile,
2-(3-chlorophenyl)-4-(3-methoxyphenyl)-4-ketobutyronitrile,
2-(2-chloro-6-fluorophenyl)-4-(3-methoxyphenyl)-4-ketobutyronitrile,
2-(2,3-dichlorophenyl)-4-(3-methoxyphenyl)-4-ketobutyronitrile,
2-phenyl-4-(3-pentyloxyphenyl)-4-ketobutyronitrile,
2-(2,6-dimethylphenyl)-4-(3-methoxyphenyl)-4-ketobutyronitrile, respectively.

PREPARATION 3

*2-phenyl-4-(3-methoxyphenyl)-4-ketobutyric acid*

A suspension of 49.22 g. of 2-phenyl-4-(3-methoxyphenyl)-4-ketobutyronitrile in a mixture of 140 ml. of concentrated sulfuric acid and 125 ml. of water was heated on a steam bath with vigorous stirring for 4 hours. The resulting mixture was cooled and diluted with ice water. The solid which separated was isolated by filtration and recrystallized from aqueous ethanol and then from benzene. There was thus obtained 29.5 g. of 2-phenyl-4-(3-methoxyphenyl)-4-ketobutyric acid in the form of a crystalline solid having a melting point of 140 to 145° C. An analytical sample having a melting point of 143 to 145° C. was obtained by recrystallization from benzene.

*Analysis.*—Calcd. for $C_{17}H_{16}O_4$: C, 71.82; H, 5.67. Found: C, 72.10; H, 5.74.

Using the above procedure, but replacing 2-phenyl-4-(3-methoxyphenyl)-4-ketobutyronitrile by the appropriately substituted 2,4-dipheyl-4-ketobutyronitrile (prepared as described in Preparation 2), there are obtained 2-phenyl-4-(3-ethoxyphenyl)-4-ketobutyric acid,
2-phenyl-4-(3-pentyloxyphenyl)-4-ketobutyric acid,
2-phenyl-4-(3-hexyloxyphenyl)-4-ketobutyric acid,
2-phenyl-4-(3-isoöctyloxyphenyl)-4-ketobutyric acid,
2-(2-bromophenyl)-4-(3-methoxyphenyl)-4-ketobutyric acid,
2-(3-chlorophenyl)-4-(3-methoxyphenyl)-4-ketobutryic acid,
2-(2-chloro-6-fluorophenyl)-4-(3-methoxyphenyl)-4-ketobutyric acid,
2-(2,3-dichlorophenyl)-4-(3-methoxyphenyl)-4-ketobutyric acid,
2-p-tolyl-4-(3-methoxyphenyl)-4-ketobutyric acid and
2-(2,6-dimethylphenyl)-4--(3-methoxyphenyl)-4-ketobutyric acid, respectively.

PREPARATION 4

*2-phenyl-4-(3-methoxyphenyl)butyric acid*

A total of 300 g. of mossy zinc was washed briefly with 2.5 N hydrochloric acid and then with water. The metal was covered with a solution of 6.7 g. of mercuric chloride in 500 ml. of water, and this mixture was allowed to stand for 30 minutes with occasional shaking. The liquid phase was decanted and the amalgamated metal was washed well with water. To the amalgamated zinc so produced was added a mixture of 29.3 g. of 2-phenyl-4-(3-methoxyphenyl)-4-ketobutyric acid and 400 ml. of hydrochloric acid. The mixture was heated cautiously to reflux temperature and then heated under reflux for a total of 20 hours, additional portions of hydrochloric acid being added after 5 hours and 10 hours of heating. The resulting mixture was cooled and the liquid was decanted from the solid. The solid residue was washed well with ether and the decanted liquid was extracted with ether. The ether extract and washings were combined and washed with water and then with saturated sodium chloride solution before being percolated through anhydrous magnesium sulfate. The percolate was evaporated to dryness. There was thus obtained 26.2 g. of 2-phenyl-4-(3-methoxyphenyl)butyric acid in the form of a viscous oil which was employed without further purification in the process of Preparation 5. The infrared spectrum of the compound (mineral oil mull) exhibited a maximum at 1705 reciprocal centimeters.

Using the above procedure, but replacing the 2-phenyl-4-(3-methoxyphenyl)-4-ketobutyric acid by the appropriately substituted 2,4-diphenyl-4-ketobutyric acid (prepared as described in Preparation 3), there are obtained 2-phenyl-4-(3-ethoxyphenyl)-,
2-phenyl-4-(3-pentyloxyphenyl)-,
2-phenyl-4-(3-hexyloxyphenyl)-,
2-phenyl-4-(3-isoöctyloxyphenyl)-,
2-(2-bromophenyl)-4-(3-methoxyphenyl)-,
2-(3-chlorophenyl)-4-(3-methoxyphenyl)-,
2-(2-chloro-6-fluorophenyl)-4-(3-methoxyphenyl)-,
2-(2,3-dichlorophenyl)-4-(3-methoxyphenyl)-,
2-p-tolyl-4-(3-methoxyphenyl)-, and
2-(2,6-dimethylphenyl)-4-(3-methoxyphenyl)-butyric acids, respectively.

PREPARATION 5

*2-phenyl-6-methoxy-1,2,3,4-tetrahydro-1-naphthalenone*

A total of 150 ml. of liquid hydrogen fluoride was added to 26.2 g. of 2-phenyl-4-(3-methoxyphenyl)butyric acid with cooling and swirling. The resulting mixture was allowed to stand at room temperature for 3 days. The residue was dissolved in methylene chloride and the solution was poured into excess concentrated aqueous potassium carbonate solution. The organic layer was separated, washed with water and saturated sodium chloride solution, and then evaporated to dryness. The residue was dissolved in 2 l. of mixed hexates (Skellysolve B) containing 7.5% by volume of acetone and the solution was passed through a column of magnesium silicate (Florisil) prewashed with the same solvent mixture. The eluate was evaporated to dryness and the residue (17.0 g.) was recrystallized twice from cyclohexane. There was thus obained 13.38 g. of 2-phenyl-6-methoxy-1,2,3,4-tetrahydro-1-naphthalenone in the form of a crystalline solid having a melting point of 113 to 116° C.

*Analysis.*— Calcd. for $C_{17}H_{16}O_2$: C, 80.92; H, 6.39. Found: C, 81.08; H, 6.35.

Using the above procedure, but replacing 2-phenyl-4-(3-methoxyphenyl)butyric acid by the appropriately substituted 2,4-diphenylbutyric acid (prepared as described in Preparation 4), there are obtained 2-phenyl-6-ethoxy-,
2-phenyl-6-pentyloxy-,
2-phenyl-6-hexyloxy-,
2-phenyl-6-isoöctyloxy-,
2-(2-bromophenyl)-6-methoxy-,
2-(3-chlorophenyl)-6-methoxy-,
2-(2-chloro-6-fluorophenyl)-6-methoxy-,
2-(2,3-dichlorophenyl)-6-methoxy-,
2-p-tolyl-6-methoxy-, and
2-(2,6-dimethylphenyl)-6-methoxy-1,2,3,4-tetrahydro-1-naphthalenones, respectively.

PREPARATION 6

*1,2-diphenyl-6-methoxy-3,4-dihydronaphthalene*

A solution of 5.04 g. (0.02 mole) of 2-phenyl-6-methoxy-1,2,3,4-tetrahydro-1-naphthalenone in 75 ml. of tetrahydrofuran was added to an ice-cooled solution of the Grignard reagent prepared from 31.4 g. (21 ml.) of bromobenzene and 4.90 g. of magnesium in 200 ml. of ether. The resulting mixture was allowed to stand at room temperature (approximately 20° C.) for 16 hours before being decomposed by the careful addition of water. The mixture so obtained was filtered and the organic filtrate was washed with water and with saturated sodium chloride solution before being dried over anhydrous sodium sulfate. The dried solution was filtered and the filtrate was evaporated to dryness. The residual gum was dissolved in methylene chloride and chromatographed twice over magnesium silicate (Florisil). The columns were eluted with petroleum ether containing increasing proportions of acetone and those fractions which, on the basis of paper chromatographic analysis, were found to contain the desired product were combined and evaporated to dryness. The fractions so obtained from the second chromatography were recrystallized from aqueous methanol. There was thus obtained 2.5 g. of 1,2-diphenyl-6-methoxy-1,2,3,4-tetrahydro-1-naphthol in the form of a crystalline solid having a melting point of 112 to 116° C. An analytical sample having a melting point of 113 to 116° C. was obtained by further recrystallization from petroleum ether.

*Analysis.*—Calcd. for $C_{23}H_{22}O_2$: C, 82.98; H, 6.96. Found: C, 83.60; H, 6.93.

A solution of 1 g. of 1,2-diphenyl-6-methoxy-1,2,3,4-tetrahydro-1-naphthol (prepared as described above) and 0.1 g. of p-toluenesulfonic acid in 100 ml. of toluene was heated for 5 hours at reflux under a Dean-Starke water trap. The solvent was then distilled from the reaction mixture and the residue was dissolved in ether. The ethereal solution was washed with saturated aqueous sodium bicarbonate solution, then with water, and finally with saturated sodium chloride solution. The washed ether solution was evaporated to dryness and the residue was recrystallized twice from Skellysolve B. There was thus obtained 0.52 g. of 1,2-diphenyl-6-methoxy-3,4-dihydronaphthalene in the form of a crystalline solid having a melting point of 90 to 92° C.

*Analysis.*—Calcd. for $C_{23}H_{20}O$: C, 88.42; H, 6.45. Found: C, 87.99; H, 6.78.

Using the above procedure but replacing 2-phenyl-6-methoxy-1,2,3,4-tetrahydro-1-naphthalenone by 2-phenyl-6-ethoxy-,
2-phenyl-6-pentyloxy-,
2-phenyl-6-hexyloxy-,
2-phenyl-6-isoöctyloxy-,
2-(2-bromophenyl)-6-methoxy-,
2-(3-chlorophenyl)-6-methoxy-,
2-(2-chloro-6-fluorophenyl)-6-methoxy-,
2-(2,3-dichlorophenyl)-6-methoxy-,
2-(p-tolyl)-6-methoxy-, and
2-(2,6-dimethylphenyl)-6-methoxy-1,2,3,4-tetrahydro-1-naphthalenone, there are obtained 1,2-diphenyl-6-ethoxy-,
1,2-diphenyl-6-pentyloxy-,
1,2-diphenyl-6-hexyloxy-,
1,2-diphenyl-6-isoöctyloxy-,
1-phenyl-2-(2-bromophenyl)-6-methoxy-,
1-phenyl-2-(3-chlorophenyl)-6-methoxy-,
1-phenyl-2-(2-chloro-6-fluorophenyl)-6-methoxy-,
1-phenyl-2-(2,3-dichlorophenyl)-6-methoxy-,
1-phenyl-2-(p-tolyl)-6-methoxy-, and
1-phenyl-2-(2,6-dimethylphenyl)-6-methoxy-3,4-dihydronaphthalene, respectively.

PREPARATION 7

*1-(p-hydroxyphenyl)-2-phenyl-6-methoxy-3,4-dihydronaphthalene*

A solution of 5.83 g. of 2-phenyl-6-methoxy-1,2,3,4-tetrahydro-1-naphthalenone in 75 ml. of tetrahydrofuran was added to a tetrahydrofuran solution containing 0.0247 mole of the Grignard reagent prepared from p-bromophenyl tetrahydropyranyl ether (Parham et al., J. Am. Chem. Soc. 70, 4187, 1948). The resulting mixture was heated under reflux for 16 hours. At the end of this time the mixture was cooled and 10 ml. of water was added. The resulting mixture was filtered and the filtrate was diluted with ether. The organic layer was separated, washed well with water, and dried over anhydrous sodium sulfate. The dried solution was filtered and the filtrate was evaporated to dryness under reduced pressure. The residue was dissolved in 100 ml. of tetrahydrofuran and again treated with the Grignard reagent as described above. The reaction mixture from the second Grignard reaction was worked up exactly as described for the first reaction mixture. The gum so obtained was dissolved in 200 ml. of benzene containing 200 mg. of p-toluenesulfonic acid and the mixture was heated under reflux under a Dean-Starke water trap until no further water was collected in the trap. The solvent was removed from the solution by distillation under reduced pressure and the residue was dissolved in a mixture of 200 ml. of acetone and 70 ml. of 0.5 N hydrochloric acid. The solution so obtained was allowed to stand for 2 hours at room temperature (about 25° C.) and then extracted with ether. The organic layer was separated and extracted with 5% aqueous potassium hydroxide solution. The aqueous alkaline extract was acidified by the addition of hydrochloric acid and the solid which separated was isolated by filtration and dried. The material so obtained was dissolved in methylene chloride and chromatographed on a column of Florisil (magnesium silicate). The column was eluted with Skellysolve B containing increasing proportions of acetone and those fractions which, on the basis of infrared and papergram analysis, were found to contain the desired compound were combined and evaporated to dryness. The residue was recrystallized twice from cyclohexane. There was thus obtained 0.71 g. of 1-(p-hydroxyphenyl) - 2-phenyl-6-methoxy-3,4-dihydronaphthalene in the form of a crystalline solid having a melting point of 130 to 131.5° C.

*Analysis.*—Calcd. for $C_{23}H_{20}O_2$: C. 84.12; H, 6.14. Found: C, 83.64; H, 5.96.

Using the procedure described above but replacing 2-phenyl-6-methoxy-1,2,3,4-tetrahydro-1-naphthalenone by 2-phenyl-6-ethoxy-,
2-phenyl-6-pentyloxy-,
2-phenyl-6-hexyloxy-,
2-phenyl-6-isoöctyloxy-,
2-(2-bromophenyl)-6-methoxy-,
2-(3-chlorophenyl)-6-methoxy-,
2-(2-chloro-6-fluorophenyl)-6-methoxy-,
2-(2,3-dichlorophenyl)-6-methoxy-,
2-(p-tolyl)-6-methoxy-, and 2-(2,6-dimethylphenyl)-6-methoxy-1,2,3,4-tetrahydro-
1-naphthalenone,
there are obtained 1-(p-hydroxyphenyl)-2-phenyl-6-ethoxy-,
1-(p-hydroxyphenyl)-2-phenyl-6-pentyloxy-,
1-(p-hydroxyphenyl)-2-phenyl-6-hexyloxy-,
1-(p-hydroxyphenyl)-2-phenyl-6-isoöctyloxy-,
1-(p-hydroxyphenyl)-2-(2-bromophenyl)-6-methoxy-,
1-(p-hydroxyphenyl)-2-(3-chlorophenyl)-6-methoxy-,
1-(p-hydroxyphenyl)-2-(2-chloro-6-fluorophenyl)-
6-methoxy-,
1-(p-hydroxyphenyl)-2-(2,3-dichlorophenyl)-6-
methoxy-,
1-(p-hydroxyphenyl)-2-(p-tolyl)-6-methoxy-, and
1-(p-hydroxyphenyl)-2-(2,6-dimethylphenyl)-6-
methoxy-3,4-dihydronaphthalene, respectively.

The corresponding 1-(o-hydroxyphenyl)- and 1-(m-hydroxyphenyl) - 2 - substituted - 6 - substituted - 3,4 - dihydronaphthalenes are obtained by employing o-bromophenyl tetrahydropyranyl ether and n-bromophenyl tetrahydropyranyl ether, respectively, in place of p-bromophenyl tetrahydropyranyl ether in the procedure of Preparation 7.

PREPARATION 8

*1-(p-fluorophenyl)-2-phenyl-6-methoxy-3,4-
dihydronaphthalene*

Using the procedure described in Preparation 6, but replacing bromobenzene by p-bromofluorobenzene, there was obtained 1-(p-fluorophenyl)-2-phenyl-6-methoxy-3,4-dihydronaphthalene in the form of a crystalline solid having a melting point of 99 to 101° C.

Similarly other 1-(halophenyl)-2-phenyl-6-alkoxy-3,4-dihydronaphthalenes are obtained by reacting the appropriate halophenylmagnesium halide with the appropriate 2 - phenyl - 6-alkoxy-1,2,3,4-tetrahydro-1-naphthalenone using the procedure described in Preparation 6.

PREPARATION 9

*1-(p-tolyl)-2-phenyl-6-methoxy-3,4-dihydronaphthalene*

Using the procedure described in Preparation 6, but replacing bromobenzene by p-bromotoluene, there was obtained 1 - (p - tolyl) - 2 - phenyl-6-methoxy-3,4-dihydronaphthalene in the form of a crystalline solid having a melting point of 100 to 103° C.

Similarly other 1-(halophenyl)-2-phenyl-6-alkoxy-3,4-dihydronaphthalenes are obtained by reacting the appropriate alkylphenylmagnesium halide with the appropriate 2 - phenyl - 6 - alkoxy - 1,2,3,4-tetrahydro-1-naphthalenone using the procedure described in Preparation 6.

EXAMPLE 1

*1,2-diphenyl-6-methoxy-1,2,3,4-tetrahydronaphthalene*

A solution of 0.63 g. of 1,2-diphenyl-6-methoxy-3,4-dihydronaphthalene in 20 ml. of tetrahydrofuran and 1 ml. of tert.butyl alcohol was added to 100 ml. of ammonia redistilled from lithium. To this there was added 28 mg. of lithium wire; the color faded very quickly. After 5 to 10 minutes an additional 28 mg. of lithium were added. The blue color this time prevailed for 20 minutes. After the addition of 1 g. of solid ammonium chloride, the mixture was taken to dryness under a stream of nitrogen. The residue was then washed with ether and methylene chloride. The solid which remained when the extracts were taken to dryness was recrystallized from ethanol. There was thus obtained 0.53 g. of 1,2-diphenyl-6-methoxy-1,2,3,4-tetrahydronaphthalene having a melting point of 160 to 162° C.

One further crystallization from the same solvent gave an analytical sample, M.P. 166 to 168° C.

*Analysis.*—Calcd. for $C_{23}H_{22}O$: C, 87.86; H, 7.05. Found: C, 87.30; H, 7.13.

EXAMPLE 2

*1-(p-hydroxyphenyl)-2-phenyl-6-methoxy-1,2,3,4-
tetrahydronaphthalene*

One gram of 1-(p-hydroxyphenyl)-2-phenyl-6-methoxy-3,4-dihydronaphthalene was reduced by means of 84 mg. of lithium in exactly the same manner as described in Example 1. The gummy solid which remained when the solvents had been removed from the reaction mixture was suspended in water and the suspension was acidified with acetic acid. The solid was collected on a filter and recrystallized twice from methanol to yield 0.40 g. of 1-(p-hydroxyphenyl) - 2-phenyl-6-methoxy-1,2,3,4-tetrahydronaphthalene, having a melting point of 188 to 190° C.

*Analysis.*—Calcd. for $C_{23}H_{22}O_2$: C, 83.60; H, 6.71. Found: C, 83.45; H, 6.89.

I claim:
1. A compound having the formula

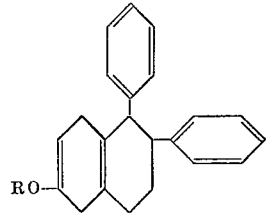

wherein R is lower alkyl of from 1 to 8 carbon atoms.

2. A compound having the formula

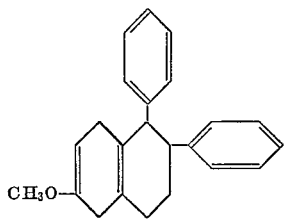

No references cited.

ALEX MAZEL, Primary Examiner

JOSE TOVAR, Assistant Examiner

U.S. Cl. X.R.

260—465, 515, 586, 590, 612; 424—339

UNITED STATES PATENT OFFICE
CERTIFICATE OF CORRECTION

Patent No. 3,456,018          Dated   July 15, 1969

Inventor(s)   Daniel Lednicer

It is certified that error appears in the above-identified patent and that said Letters Patent are hereby corrected as shown below:

Column 6, lines 22-23, for "comprises the" read -- comprises reacting the --.  Column 7, line 38, for "2-phenyl-4-(3-pentyloxyphenyl)-4-ketobutyronitrile" read -- 2-p-tolyl-4-(3-methoxyphenyl) 4-ketobutyronitrile, and -- Column 11, line 48, for "1-(halophenyl)-2-" read -- 1-(alkylphenyl)-2- --.  Column 12, lines 29-30, for "Found:  C, 83.45; H, 6.89.
|claim:" read -- Found:  C, 83.45; H, 6.89.

Example 11   1-(p-methoxyphenyl)-2-phenyl-6-methoxy-1,2,3,4-tetrahydronaphthalene Using the procedure described in Example 6, but replacing 3-chloro-1,2-propanediol by methyl iodide and reducing the reaction time to 2 hours, there is obtained 1-(p-methoxyphenyl)-2-phenyl-6-methoxy-1,2,3,4-tetrahydronaphtahlene.

Example 12   1-(p-tolyl)-2-phenyl-6-methoxy-1,2,3,4-tetrahydronaphthalene

Using the procedure described in Example 1, but replacing 1,2-diphenyl-3,4-dihydronaphthalene by 1-(p-tolyl)-2-phenyl-6-methoxy-3,4-dihydronaphtahlene, there is obtained 1-(p-tolyl)-2-phenyl-6-methoxy-1,2,3,4-tetrahydronaphthalene.

Similarly, using the procedure described in Example 1, but replacing 1,2-diphenyl-3,4-dihydronaphthalene by 1-(p-hydroxyphenyl)-2-phenyl-6-ethoxy-,
   1-(p-hydroxyphenyl)-2-phenyl-6-pentyloxy-,
   1-(p-hydroxyphenyl)-2-phenyl-6-hexyloxy-,
   1-(p-hydroxyphenyl)-2-phenyl-6-isooctyloxy-,
   1-(p-hydroxyphenyl)-2-(2-bromophenyl)-6-methoxy-, Example 13  1,2-diphenyl-6-methoxy-1,2,3,4,5,8-hexahydronaphthalene A solution of 0.31 g. of 1,2-diphenyl-6-methoxy-1,2,3,4-tetrahydronaphthalene in 10 ml. of tetrahydrofuran and 1 ml. of tert. butyl alcohol was added to 50 ml. of liquid ammonia redistilled from lithium.  Lithium wire (0.07 g.) was added in 7 equal portions to the mixture at 5-minute intervals.

UNITED STATES PATENT OFFICE
CERTIFICATE OF CORRECTION

Patent No. 3,456,018             Dated   July 15, 1969

Inventor(s)  Daniel Lednicer

It is certified that error appears in the above-identified patent and that said Letters Patent are hereby corrected as shown below:

The resulting mixture was stirred for 30 minutes before 3 ml. of <u>tert</u>. butyl alcohol was added. Following an additional 25 minutes stirring, there was added 0.3 g. of ammonium chloride. The solvent was evaporated from the mixture under a stream of nitrogen and the residue was treated with water. The solid was collected on a filter and recrystallized from ligroin to afford 1,2-diphenyl-6-methoxy-1,2,3,4,5,8-hexahydronaphthalene having a melting point of 132 to 134° C.

<u>Anal</u>. Calcd. for $C_{23}H_{24}O$: C, 87.30; H, 7.65.
Found: C, 87.02; H, 7.90.

Example 14   1-(p-hydroxyphenyl)-2-phenyl-6-methoxy-1,2,3,4,5,8-hexahydronaphthalene Using the procedure described in Example 13, 0.66 g. of 1-(p-hydroxyphenyl)-2-phenyl-6-methoxy-1,2,3,4-tetrahydronaphthale was reduced with 154 mg. of lithium. The reaction mixture was worked up as in Example 13 and the product was recrystallized from aqueous methanol. There was obtained 0.55 g. of 1-(p-hydroxyphenyl)-2-phenyl-6-methoxy-1,2,3,4,5,8-hexahydronaphthalene having a melting point of 184.5 to 187.5° C. An analytical sample prepared by further recrystallization from the same solvent melted at 183 to 185° C.

<u>Anal</u>. Calcd. for $C_{23}H_{24}O_2$: C, 83.10; H, 7.28.
Found: C, 83.07; H, 7.40.

Using the procedure described in Example 13, but replacing 1,2-diphenyl-6-methoxy-1,2,3,4-tetrahydronaphthalene by the appropriately substituted 1,2-diphenyl-6-alkoxy-1,2,3,4-tetrahydronaphthalene is productive of the corresponding 1,2,3,4,5,8-hexahydronaphthalene. Representative of the latter compounds so prepared are 1-(p-hydroxyphenyl)-2-phenyl-6-ethoxy-,
1-(p-hydroxyphenyl)-2-phenyl-6-pentyloxy-,
1-(p-hydroxyphenyl)-2-phenyl-6-hexyloxy-,
1-(p-hydroxyphenyl)-2-phenyl-6-isooctyloxy-,

UNITED STATES PATENT OFFICE
CERTIFICATE OF CORRECTION

Patent No. 3,456,018      Dated July 15, 1969

Inventor(s) Daniel Lednicer

It is certified that error appears in the above-identified patent and that said Letters Patent are hereby corrected as shown below:

1-(p-hydroxyphenyl)-2-(2-bromophenyl)-6-methoxy-,
1-(p-hydroxyphenyl)-2-(3-chlorophenyl)-6-methoxy-,
1-(p-hydroxyphenyl)-2-(2-chloro-6-fluorophenyl)-6-methoxy-,
1-(p-hydroxyphenyl)-2-(2,3-dichlorophenyl)-6-methoxy-,
1-(p-hydroxyphenyl)-2-(p-tolyl)-6-methoxy-,
1-(p-hydroxyphenyl)-2-(2,6-dimethylphenyl)-6-methoxy-,
1,2-diphenyl-6-ethoxy-,
1,2-diphenyl-6-pentyloxy-,
1,2-diphenyl-6-hexyloxy-,
1,2-diphenyl-6-isooctyloxy-,
1-phenyl-2-(2-bromophenyl)-6-methoxy-,
1-phenyl-2-(3-chlorophenyl)-6-methoxy-,
1-phenyl-2-(2-chloro-6-fluorophenyl)-6-methoxy-,
1-phenyl-2-(p-tolyl)-6-methoxy-,
1-phenyl-2-(2,6-dimethylphenyl)-6-methoxy-, and
1-(p-fluorophenyl)-2-phenyl-6-methoxy-1,2,3,4,5,8-hexahydronaphthalene.

I claim: --.

Signed and sealed this 20th day of July 1971.

(SEAL)
Attest:

EDWARD M. FLETCHER, JR.
Attesting Officer

WILLIAM E. SCHUYLER, JR.
Commissioner of Patents